United States Patent [19]

Kodama

[11] Patent Number: 5,006,881
[45] Date of Patent: Apr. 9, 1991

[54] BATTERY SUPPLYING APPARATUS FOR CAMERA

[75] Inventor: Yasumasa Kodama, Kanagawa, Japan

[73] Assignee: Sony Corporation, Tokyo, Japan

[21] Appl. No.: 419,751

[22] Filed: Oct. 11, 1989

[30] Foreign Application Priority Data

Oct. 14, 1988 [JP] Japan .................................. 63-259013

[51] Int. Cl.$^5$ .......................... G03B 7/26; H04N 5/225
[52] U.S. Cl. ...................................... 354/484; 358/909
[58] Field of Search .................. 354/484, 418; 358/909

[56] References Cited

U.S. PATENT DOCUMENTS 4,645,325  2/1987  Inoue et al. ......................... 354/484
4,827,332  5/1989  Miyake et al. .................. 358/909 X Primary Examiner—L. T. Hix
Assistant Examiner—Jae N. Noh
Attorney, Agent, or Firm—Lewis H. Eslinger

[57] ABSTRACT

An electric power supply system for a camera that includes a camera body containing a charging circuit for a stroboscope and a signal processor, and at least a primary battery type of power supply package accommodating a primary battery electrically connected by terminals disposed on the package and terminals disposed on the camera body. The terminals of the package include a first positive terminal connected through a voltage stabilizer to the positive electrode of the primary battery, a second positive terminal connected to the positive electrode of the primary battery, and a minus terminal connected to the negative electrode of the primary battery. The terminals of the camera body include a first input terminal for the signal processor connected through the first positive terminal via the voltage stabilizer to the positive electrode of the primary battery, a second input terminal for the charging circuit connected through the second positive terminal to the positive electrode of the primary battery, and a minus terminal for the signal processor and the charging circuit connected through the minus terminal of the package to the negative electrode of the primary battery.

12 Claims, 5 Drawing Sheets

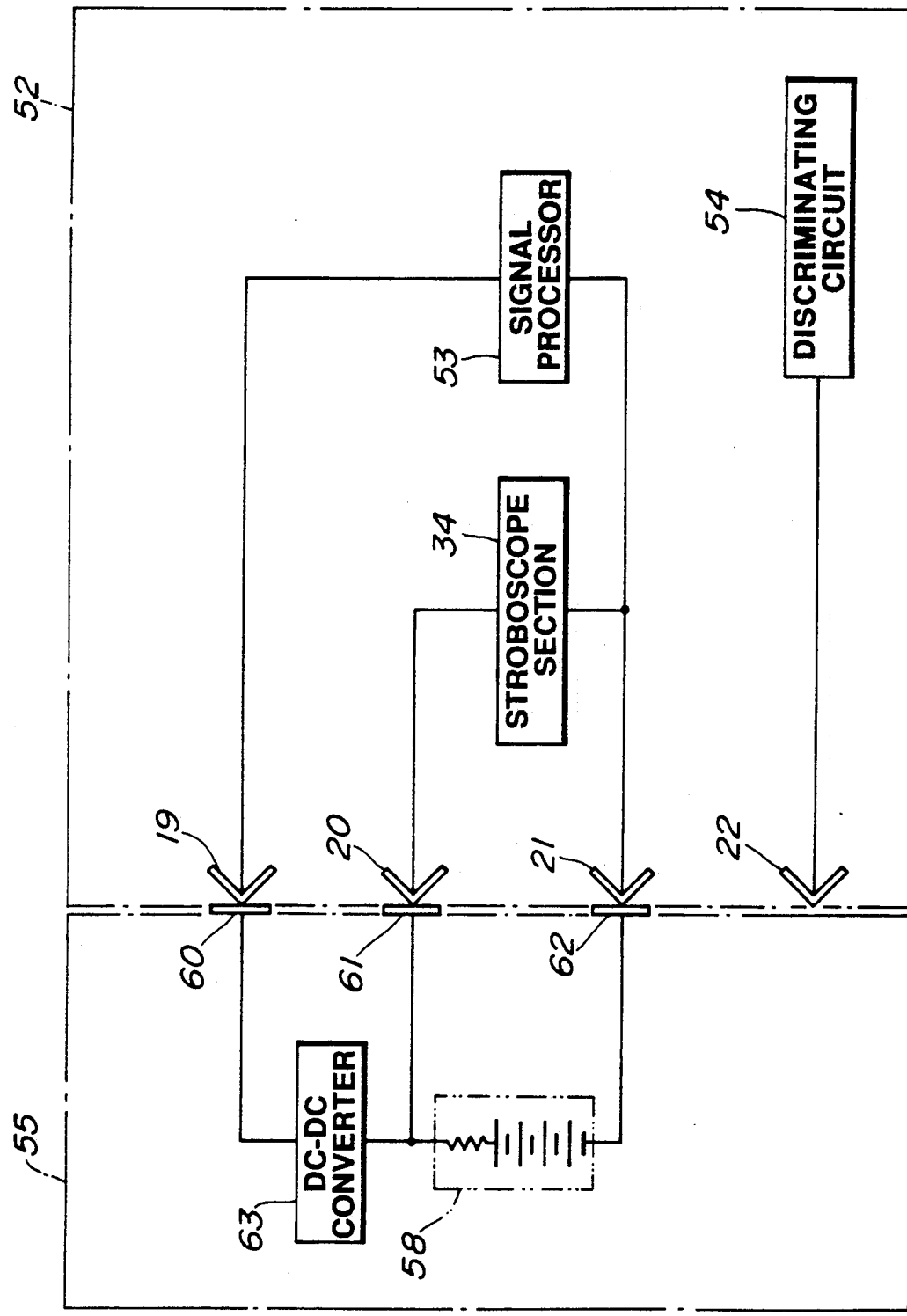

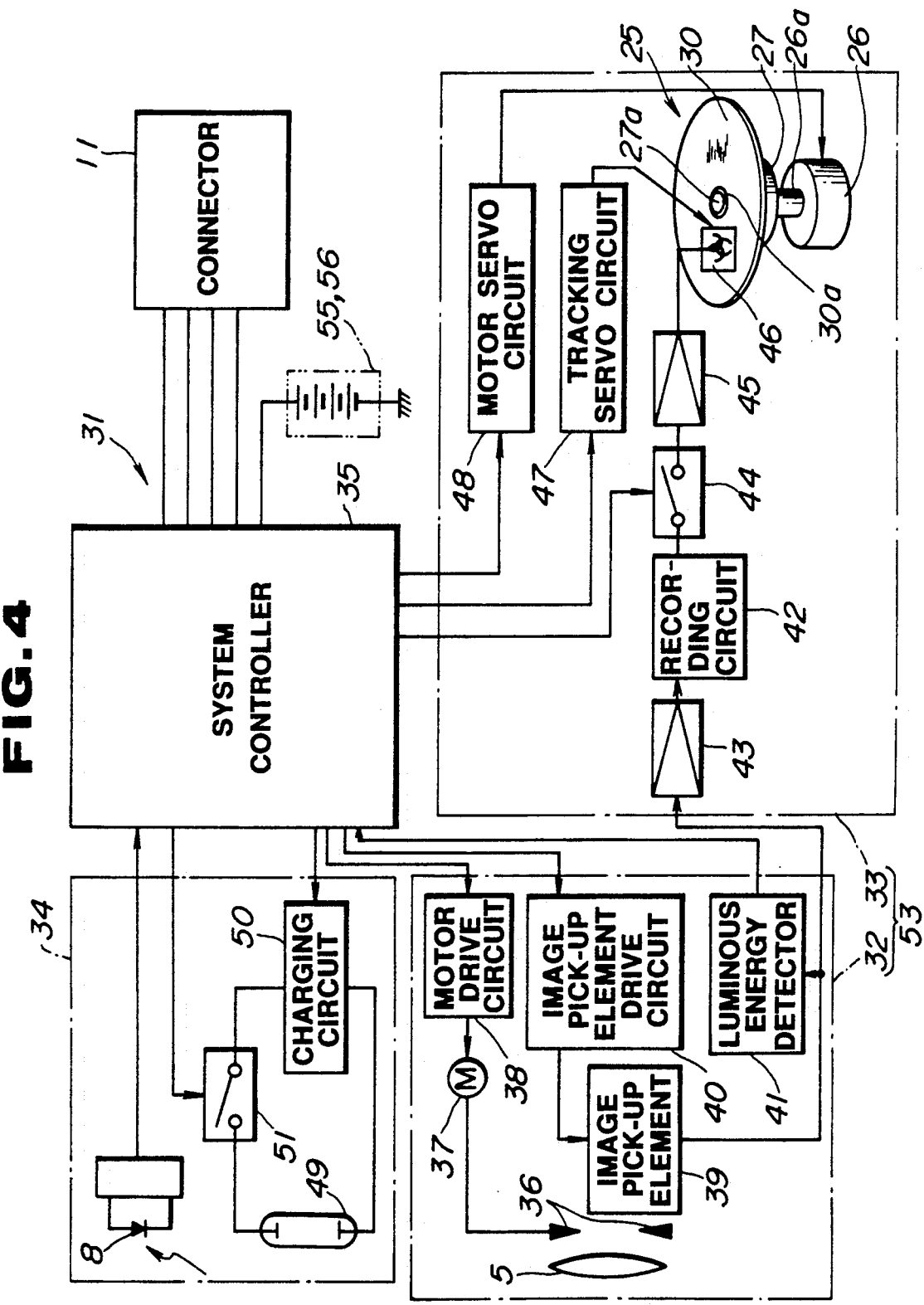

BATTERY SUPPLYING APPARATUS FOR CAMERA

BACKGROUND OF THE INVENTION

1. Field of the Invention

This invention relates generally to an electric power supply system for a camera and, more particularly, to a power supply system for a camera having a large capacity condenser for a stroboscopic tube, a signal processor for processing image signals from an image pick-up element, and at least a primary battery.

2. Description of the Background

Recently there have been proposed and developed various cameras that include a stroboscope or xenon flash tube and a signal processor. Generally, such cameras include a charging circuit and a large capacity condenser for momentarily supplying a large current to the stroboscope. Typically, a primary battery, such as an alkaline battery, is provided for the so-called flash and a secondary battery, such as a nickel-cadmium battery, is provided for the signal processor in such cameras. Usually, the stroboscope and the signal processor have a common power supply. Because the primary battery has a much greater internal resistance than the secondary battery, when the primary battery is used as the power supply for both the stroboscope and the signal processor, an excessive voltage drop relative to the signal processor occurs during operation of the stroboscope. This voltage drop is caused by the large current flowing from the condenser employed in the charging circuit for the stroboscope to the discharge element, that is, the flash tube. As a result of this voltage drop, the signal processor may operate erroneously or it may not operate at all. For this reason, this kind of camera requires a relatively large number of primary battery cells to provide a large enough power capacity to compensate for the voltage drop. The drawback of this is that such a camera is inconvenient to use because the large battery package is heavy and changing of the batteries is cumbersome.

OBJECTS AND SUMMARY OF THE INVENTION

Accordingly, it is an object of the present invention to provide a camera power supply to power both the flash and the signal processor that can eliminate the defects inherent in previously known cameras.

It is another object of the present invention to provide an electric power supply system for a camera having a large load circuit, such as a charging circuit employing a high-capacity condenser for a flash unit, and a signal processor for processing signals, such as image signals from an image pick-up element, in which a constant voltage is applied to the signal processor regardless of the magnitude of the internal resistance of the battery applied to the large load circuit.

In accordance with an aspect of the present invention in an electric power supply system for a camera including a camera body containing a large load circuit with a stroboscope and a signal processor, and at least a primary battery type of power supply package serving as an electric power supply for the camera, a first terminal is provided on the camera body for connecting the primary battery to the large load circuit and the signal processor and includes a first positive terminal connected through a voltage stabilizer to the positive electrode of the primary battery, a second positive terminal connected to the positive electrode of the primary battery, and a minus terminal connected to the negative electrode of the primary battery. A second terminal is provided on the camera body for connecting the primary battery to the large load circuit and the signal processor and includes a first input terminal for the signal processor connected through the first positive terminal via the voltage stabilizer to the positive electrode of the primary battery, a second input terminal for the large load circuit connected through the second positive terminal to the positive electrode of the primary battery, and a minus terminal for the large load circuit and the signal processor connected through the minus terminal of the package to the negative electrode of the primary battery. The voltage stabilizer may be constructed as a DC-DC converter.

According to another aspect of the invention, an electric power supply system for a camera includes an image pick-up element for monitoring an image in the field of view of the camera that generates a signal representative of the image, a signal processor for processing the signal from the image pick-up element into a recordable signal for recordation on a recording medium, and a strobe device for emitting a flash of light. The strobe device includes a charging circuit capable of supplying a large current to generate the stroboscopic light. The power supply system further includes a holder for either a first battery package having a relatively large internal resistance or a second battery package having an internal resistance smaller than the first battery package. A device is provided for discriminating whether the holder holds the first battery package or the second battery package. A voltage stabilizer is provided for stabilizing the voltage output from the first battery package, and the voltage stabilizer produces a substantially constant voltage. The signal processor receives the constant voltage output from the voltage stabilizer when the device determines that the holder holds the first battery package. Needless to say, the first battery package includes a primary battery, while the second battery package includes a secondary battery. The first battery package also includes the voltage stabilizer, which may be a DC-DC converter.

The holder includes a first input terminal for the signal processor, a second input terminal for the strobe device, and a minus terminal for the signal processor and the strobe device.

The first battery package includes a first positive terminal connected through the voltage stabilizer to the positive electrode of the first battery package, a second positive terminal connected to the positive electrode of the first battery package, and a minus terminal connected to the negative electrode of the first battery package. When the holder holds the first battery package, the first input terminal is connected through the first positive terminal of the first battery package via the voltage stabilizer to the positive electrode of the first battery package. The second input terminal is connected through the second positive terminal of the first battery package to the positive electrode of the first battery package, and the minus terminal of the holder is connected through the minus terminal of the first battery package to the negative electrode of the first battery package.

The second battery package includes a positive terminal connected to the positive electrode of the second battery package and a minus terminal connected to the negative electrode of the second battery package. When the holder holds the second battery package, the first and second input terminals are connected through the positive terminal of the second battery package to the positive electrode, and also the minus terminal of the holder is connected through the minus terminal of the second battery package to the negative electrode of the second battery package. The device for determining battery size includes a discriminating terminal disposed in the holder. In addition, the second battery package includes a terminal associated with the discriminating terminal and connected to either electrode of the second battery package. The device determines that the holder holds the second battery package when the discriminating terminal contacts the associated terminal of the second battery package.

The above and other objects, features, and advantages of the present invention will become apparent from the following detailed description of illustrative embodiments thereof to the read in conjunction with the accompanying drawings, in which like reference numerals represent the same or similar elements.

BRIEF DESCRIPTION OF THE DRAWINGS

FIG. 1A is a block diagram illustrating an electric power supply system for a camera according to an embodiment of the present invention, wherein a primary battery power supply package is attached to the camera body;

FIG. 4 is a block diagram illustrating the circuits of a still video camera according to an embodiment of the present invention.

DETAILED DESCRIPTION OF PREFERRED EMBODIMENTS

The principles of the present invention as applied to an electric power supply system for a camera having a large load employing a stroboscope, a signal processor, and at least a primary battery are illustrated in FIGS. 1A through 4 discussed hereinbelow. In this embodiment, the electric power supply system of the invention is applicable to an electronic still camera or still video camera that is selectively capable of using a primary battery package, such as an alkaline battery package, or a secondary battery package, such as a Nickel-Cadmium (Ni-Cd) battery package.

Figure 2:
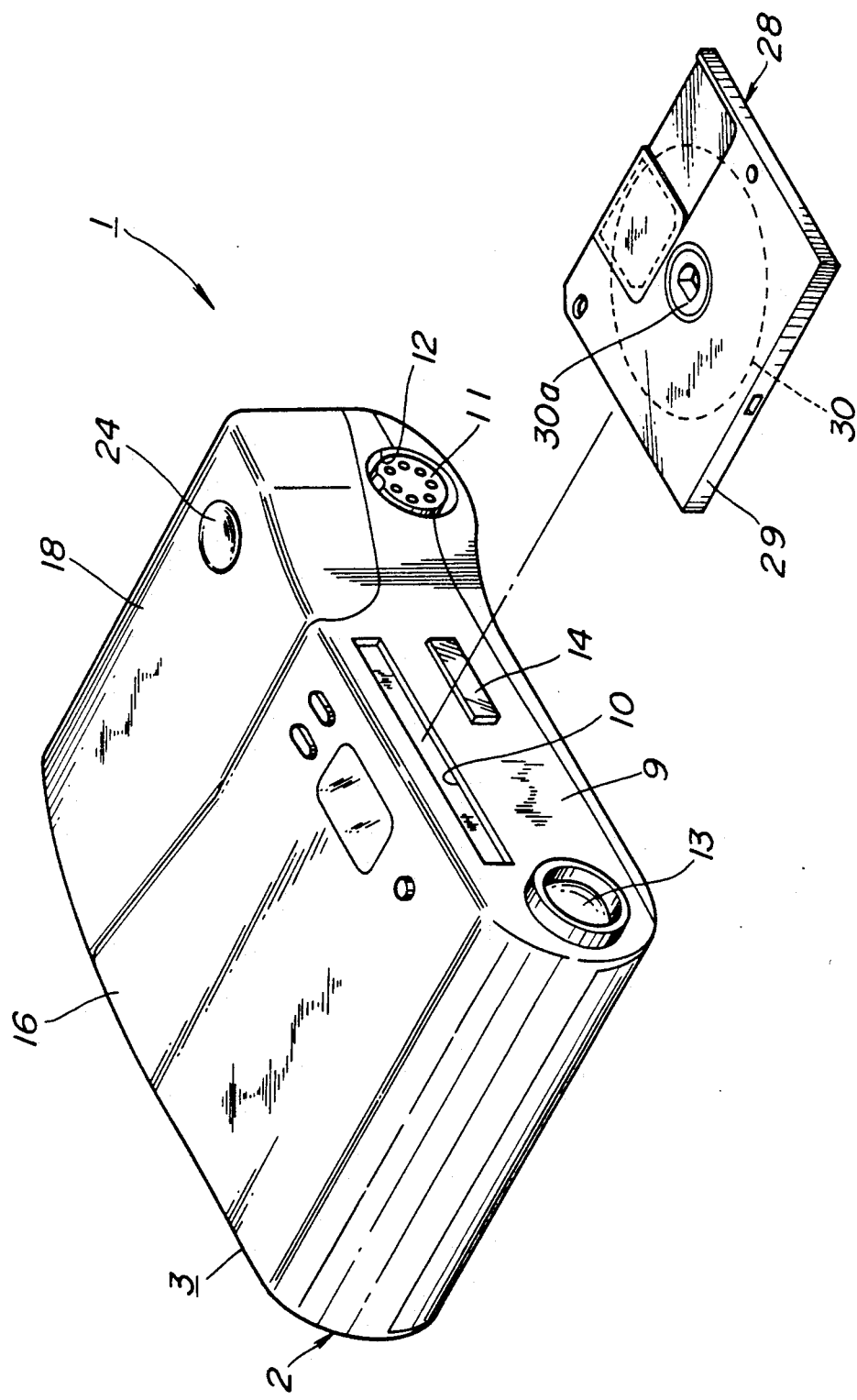
FIG. 2 is a perspective view of a still video camera and its disc cassette, having mounted thereon a power supply according to an embodiment of the present invention.
Figure 3:
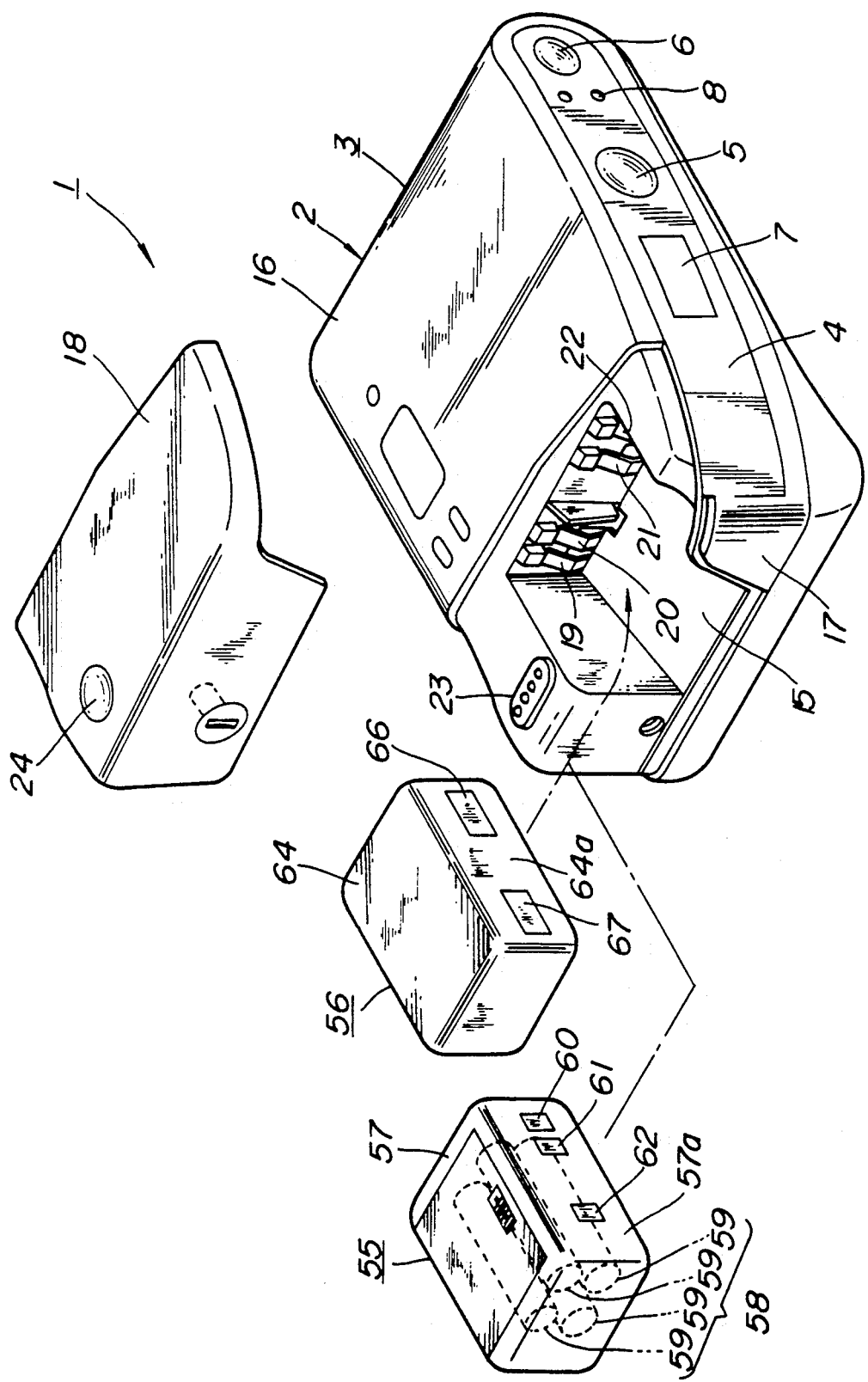
FIG. 3 is an exploded perspective view of a still video camera having a power supply according to an embodiment of the present invention, wherein a battery cover and a battery package including a primary or a secondary battery power supply package is separated from the camera body.

Referring first to FIGS. 2 and 3, a still video camera system 1 includes a camera assembly 2 formed as a substantially box-shaped camera body 3 with a photographic lens 5 arranged at the front surface 4 of camera body 3. The camera body 3 also includes an objective lens 6 that acts as a viewfinder, and another lens 7 that transmits stroboscopic light emitted from a gas discharge lamp, which will be described below, and a light receiver 8 for making exposure adjustments. The camera body 3 also includes a rectangular, elongated opening 10 at the rear surface 9 for inserting a floppy disc cassette 28. A connector 11 is mounted in a circular opening 12 for connecting the input and output terminals of an external recording and/or reproducing apparatus (not shown), such as a video tape recorder. An eyepiece 13, and an eject button 14 for ejecting disc cassette 28 from camera assembly 2 is also provide on rear surface 9.

A battery holding section 15 detachably holds an electric power supply package, which will be described in detail below. Battery holding section 15 includes a substantially rectangular cavity formed in camera body 3 at the corner where the upper and side surfaces 16 and 17, respectively, of camera body 3 intersect. Battery holding section 15 is covered by a detachable battery cover 18, moulded to follow the contours of camera body 3.

As shown in FIG. 3, four electrical terminals 19, 20, 21, and 22 are mounted along the inner side wall of battery holding section 15 and arranged to align with the electrical contacts provided on a primary battery package 55 or a secondary battery package 56. Terminal 19, disposed closest the rear surface 9 of camera body 3, is an input terminal for a signal processor that will be described in detail below. Adjacent terminal 19 is terminal 20, which is an input terminal connected for the charging circuit of the stroboscope. Terminal 21 is a minus terminal for the stroboscope and the signal processor, and the foremost terminal 22 is for a discriminating circuit, which will be described below, for determining whether the power supply package is a primary battery type of power supply package, referred to as a "primary battery pack", or a secondary battery type of power supply package, referred to as a "secondary battery pack."

In FIG. 3, camera body 3 also includes a shutter release switch 23 aligned with a shutter release button 24 provided in battery cover 18, so that when battery cover 18 is precisely installed on camera body 3 release switch 23 can be operated by depressing shutter release button 24. As shown in FIG. 2, disc cassette 28 is comprised of a substantially square, thin cassette casing 29, a magnetic disc 30, shown in phantom, rotatably accommodated therein, and a center core 30a for connection with a disc drive mechanism.

A disc drive mechanism 25 is shown in FIG. 4 and is arranged inside camera body 3 and includes a spindle motor 26 having a rotatable shaft 26a and a substantially disc-like chucking member 27, which is fixed on shaft 26a and is rotatable therewith. According to this embodiment, when disc cassette 28 is properly inserted through opening 10 into camera body 3, center core 30a of disc 28 and drive shaft 27a disposed in the center of chucking member 27 engage each other and, thus, magnetic disc 30 is rotated with chucking member 27.

As further shown in FIG. 4, an overal system circuit 31 for still camera system 1 comprises a photographic section 32, a recording section 33, a stroboscope section 34, and a system controller 35 for controlling photographic section 32, recording section 33, and stroboscope section 34. A signal processor, not shown in FIG. 4, processes signals from photographic section 32 and recording section 33.

Photographic section 32 includes an iris 36 for adjusting the amount of light passing through lens 5 and falling on the light receiving plane of the camera, whereat an image pick-up element 39, such as a CCD image sensor, a MOS image sensor, or the like, is located. Iris 36 and image pick-up element 39 are arranged along the optical axis of lens 5 and behind lens 5 in that order. Iris 36 is driven by an iris motor 37, which is controlled by system controller 35 through a motor drive circuit 38. Image pick-up element 39 is also controlled by system controller 35 through a drive circuit 40 that electronically drives the shutter of the camera, as well as energizes image pick-up element 39, when shutter button 24 is depressed. Image pick-up element 39 also serves as a photometric sensor, whereby a signal output from image pick-up element 39 is transmitted to a luminous energy detector 41 through which 'luminance of field' information is supplied to system controller 35.

Recording section 33 includes an amplifier 43 for amplifying the output signal from image pick-up element 39 and a recording circuit 42 receiving the amplified signal from amplifier 43. Recording section 33 also includes a second amplifier 45 for amplifying signals from recording circuit 42 and a gate circuit 44 disposed between recording circuit 42 and amplifier 45 that is selectively opened and closed by system controller 35. Recording section 33 further includes a magnetic head 46 for recording the information transmitted from image pick-up element 39 through amplifier 43, recording circuit 42, and amplifier 45 onto magnetic disc 30 located inside the floppy disc cassette. Tracking control of magnetic head 46 relative to the plurality of concentric tracks of magnetic disc 30 is accomplished by a tracking servo circuit 47 that controls a stepping motor (not shown) serving as a head carriage. The previously described spindle motor 26 is controlled by a separate motor servo circuit 48. Both servo circuits 47 and 48 are controlled by respective signals from system controller 35.

As described above, a signal from image pick-up element 39 is amplified by amplifier 43 and then modulated by recording circuit 42 into a recordable signal. Subsequently, the modulated signal is fed via gate circuit 44, which is opened at a predetermined gate timing determined by system controller 35, through amplifier 45 to magnetic head 46. In this manner, the information from image pick-up element 39 may be recorded on disc 30 by head 46.

Stroboscope section 34 includes light receiver device 8, shown in FIG. 3, a discharge lamp 49 disposed behind the light transmitting lens, a charging circuit 50 having a large capacity condenser therein for supplying a large magnitude of current to discharge lamp 49, and synchro contact point 51, which is closed for a predetermined time interval in response to a control signal output from controller 35.

Stroboscope section 34 operates in accordance with the following steps. First, controller 35 receives 'luminance of field' information from image pick-up element 39 through luminous energy detector 41 and, as a result, system controller 35 determines the level of luminous energy available for recording. If the field luminosity is insufficient, system controller 35 outputs a control signal representing a charging command to the charging circuit 50. At this signal, voltage is applied from the power supply package to the condenser of charging circuit 50, until the charging is complete. In such case, since system controller 35 has determined a lack of luminous energy, it simultaneously outputs a control signal representing a closing command to synchro contact point 51 in synchronization with a shutter release signal output from shutter release switch 23. After the output of the closing command from system controller 35, synchro contact point 51 is closed which closes the circuit comprised of discharge lamp 49 and the condenser of charging circuit 50, thereby resulting in the triggering of gas discharge lamp 49. Therefore, a large electric charge is supplied from the condenser to discharge lamp 49, and as a result a flash of light is emitted from discharge lamp 49 through lens 7 onto the field. In addition, light receiver device 8 receives reflected light from the field and a signal representing the distance between the field and the camera is output from light receiver to controller 35 and, thereafter, system controller 35 controls the light-emitting period of discharge lamp 49. Accordingly, the light emitting period corresponds to the time synchro contact points 51 are closed.

Figure 1B:
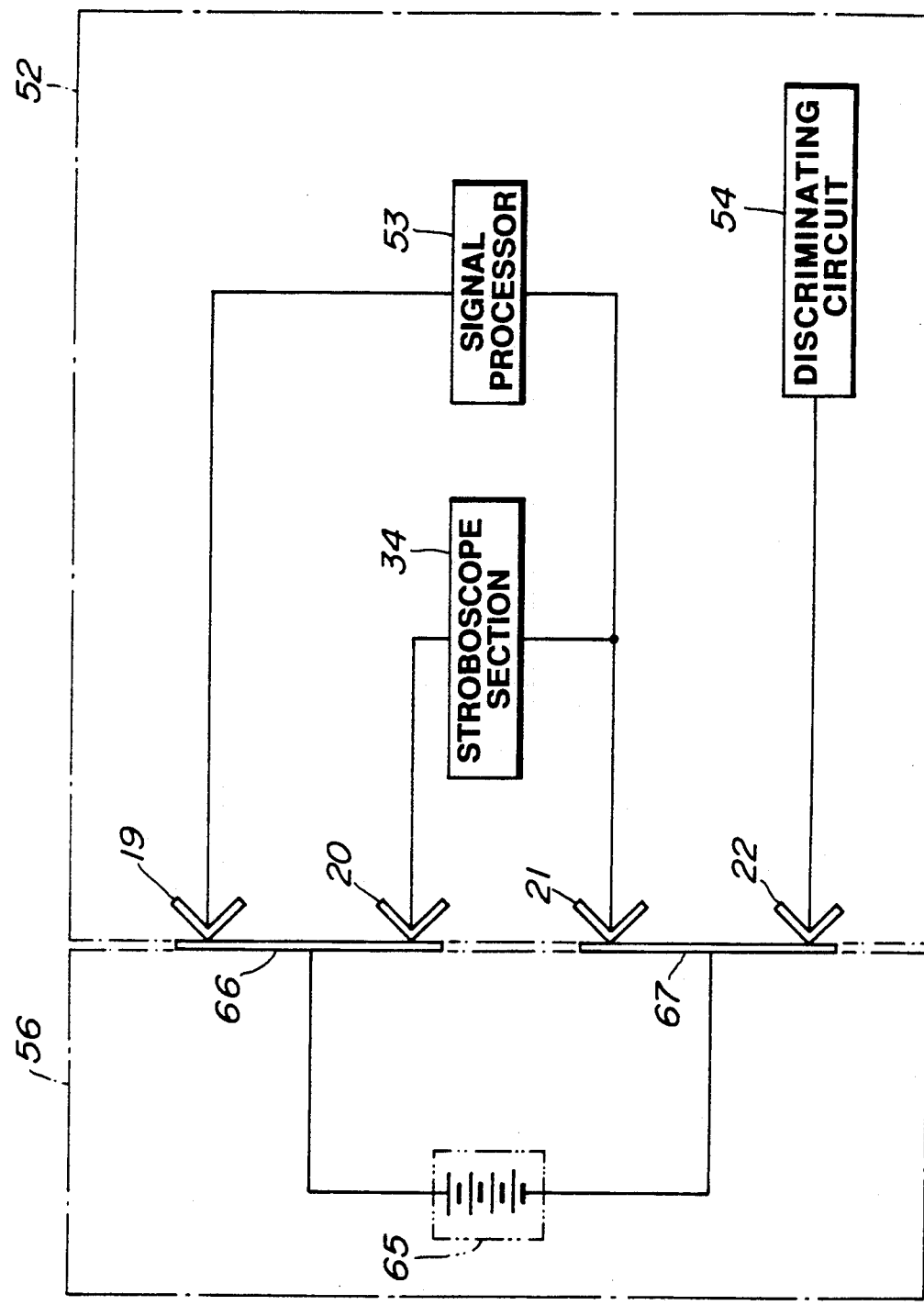
FIG. 1B is a block diagram illustrating an electronic power supply system for a camera according to an embodiment of the present invention, wherein a secondary battery power supply package is attached to the camera body.

Referring to FIGS. 1A and 1B, broken-line block 52 indicates the circuits that are provided within camera body 3, and which include stroboscope section 34, signal processor 53, and a discriminating circuit 54 for determining whether the power supply mounted on the camera is a primary battery pack 55 or a secondary battery pack 56. Discriminating circuit 54 is provided in order to charge secondary battery pack 56 through a battery charging device (not shown) only when the connected power supply is determined to be the secondary battery. According to this arrangement, when the power supply is primary battery pack 55, charging current to the primary battery is prevented by discriminating circuit 54. Block 52 also includes the four terminals 19, 20, 21, and 22 that are arranged in battery holding section 15 of camera body 3. As represented in FIGS. 1A and 1B, terminal 19 is a positive voltage terminal for signal processor 53, terminal 20 is a positive voltage terminal for stroboscope section 34, terminal 21 is a negative voltage terminal for both signal processor 53 and stroboscope section 34, and terminal 22 is a discriminating terminal for discriminating circuit 54, which as noted is provided to determine whether the power supply is connected to a primary battery or a secondary battery.

Additionally, in FIGS. 1A and 1B, broken-line block 55 represents the primary battery pack and broken-line block 56 designates the second battery pack. Either primary battery pack 55 or secondary battery pack 56 may be selectively attached to battery holding section 15 in camera body 3 by the camera user.

As shown in FIG. 3, primary battery pack 55 includes a battery casing 57, which is to be inserted into battery holding section 15, that houses a primary battery system 58 comprised of four alkaline batteries 59 connected in series, for example. Primary battery pack 55 also includes three terminals 60, 61, and 62 each arranged on an outer side wall 57a of battery casing 57 in such a manner as to come into contact with terminals 19, 20, and 21, respectively, when primary battery pack 55 is properly installed in battery holding section 15. In primary battery pack 55, terminal 60 is a positive voltage terminal connected through a DC-DC converter 63 of FIG. 1A to a positive electrode of primary battery assembly 58. Terminal 61 is also a positive voltage terminal directly connected to the positive electrode of primary battery assembly 58, and terminal 62 is a negative voltage terminal directly connected to a negative electrode of primary battery 58. In this manner, when primary battery pack 55 is properly installed into battery holding section 15 of camera body 3, signal processor 53 is connected through DC-DC converter 63 via terminals 19 and 60 to primary battery 58, while stroboscope 34 is connected via terminals 20 and 61 directly to primary battery 58.

As will be appreciated from the above, when a large current flows through the condenser of charging circuit 50 to discharge lamp 49 in response to a command from system controller 35, a voltage drop momentarily occurs due to the internal resistance of primary battery 58. Nevertheless, a constant voltage is continuously applied through DC-DC converter 63 to signal processor 53 regardless of any such voltage drop. As shown in FIG. 1A, primary battery pack 55 does not include a terminal associated with discriminating terminal 22, thereby permitting discriminating circuit 54 to determine that primary battery pack 55 is installed within battery holding section 15.

Secondary battery pack 56 includes a battery casing 64, shown in FIG. 3, which is detachably fitted into battery holding section 15, and includes a secondary battery 65, represented in FIG. 1B, which may be comprised of a Ni-Cd battery, for example. Secondary battery pack 56 also includes two terminals 66 and 67 arranged on an outer side wall 64a of battery casing 64 in a manner in which terminal 66 contacts both terminals 19 and 20, while terminal 67 contacts both terminals 21 and 22 when secondary battery pack 56 is properly installed in battery holding section 15. Terminal 66 is a positive voltage terminal directly connected to a positive electrode of secondary battery 65 and terminal 67 is a negative voltage terminal directly connected to a negative electrode of secondary battery 65. In this manner, when secondary battery pack 56 is properly installed in battery holding section 15 of camera body 3, signal processor 53 and stroboscope section 34 are connected via respective terminals 19 and 20 through terminal 66 directly to the positive electrode of secondary battery 65. When a large current flows through the condenser of charging circuit 50 to gas discharge lamp 49 in response to the command from controller 35, only a slight voltage drop occurs caused by extremely small internal resistance of secondary battery 65, that is, typically a Ni-Cd battery. Because this voltage drop is negligible, the operation of signal processor 53 remains substantially unaffected.

As shown in FIG. 1B, secondary battery pack 56 includes terminal 67 connected to discriminating terminal 22, thereby permitting discriminating circuit 54 to determine that secondary battery pack 56 is installed in battery holding section 15. Therefore, if charging of secondary battery 65 is required, it can be charged through a separate battery charging device (not shown).

In the above described embodiment, although terminal 67 associated with discriminating terminal 22 and with the negative battery terminal 21 for stroboscope section 34 and signal processor 53 is common, the respective associated terminals for terminal 21 and terminal 22 may also be separately formed. Furthermore, although discriminating circuit 54 determines the primary or secondary battery packs by means of contact between terminal 22 and associated terminal 67 connected to the negative electrode of secondary battery 65, discriminating circuit 54 may also discriminate by making electrical contact between terminal 22 and the associated terminal connected to the positive electrode of secondary battery 65.

Although the present invention has been disclosed in terms of a power supply system for an electronic still camera, or still video camera, with a stroboscope in which either a primary battery pack or a secondary battery pack may selectively serve as the power supply, the power supply circuit according to the present invention may be applied to a camera having only a primary battery pack or a camera having a primary battery pack and an AC adaptor or other power source.

While the foregoing is a description of a preferred mode for carrying out the present invention, it will be understood that the invention is not limited to the particular embodiments shown and described herein, but may include variations and modifications without departing from the scope or spirit of this invention, which should be determined by the following claims.

What is claimed is:

1. In an electric power supply system for a camera including a camera body employing a large load circuit with a flash lamp and a signal processor, and at least a removable, primary power supply package accommodating a primary battery serving as an electric power supply for said camera, the improvement comprising:

first terminal means disposed on said power supply package for connecting said primary battery to said large load circuit and to said signal processor;

voltage stabilizer means disposed on said power supply package to compensate for voltage fluctuations caused by said flash lamp;

said first terminal means including a first positive terminal connected through said voltage stabilizer means to a positive electrode of said primary battery, a second positive terminal connected to said positive electrode of said primary battery, and a minus terminal connected to a negative electrode of said primary battery; and second terminal means disposed on said camera body for connecting said primary battery to said large load circuit and to said signal processor;

said second terminal means including a first input terminal for said signal processor connected through said first positive terminal via said voltage stabilizer means to said positive electrode of said primary battery, a second input terminal for said large load circuit connected through said second positive terminal to said positive electrode of said primary battery, and a minus terminal for said large load circuit and said signal processor connected through said minus terminal of said package to said negative electrode of said primary battery.

2. The electric power supply as set forth in claim 1, wherein said voltage stabilizer means comprises a DC-DC converter.

3. The electric power supply as set forth in claim 1, wherein said power supply package is of a rectangular solid shape and said first positive terminal, said second positive terminal, and said minus terminal are arranged on the same side of the rectangular solid shape.

4. The electric power supply as set forth in claim 1, wherein said camera further includes a detector for distinguishing the presence in the camera of the primary power supply package from a same shaped secondary power supply package and said minus terminal of said first terminal means is of a size for detection by said detector.

5. An electric power supply system for a camera comprising:

image pick-up means for generating a signal representing an image in a field of view of the camera;

a signal processor for processing the signal from said image pick-up means into a recordable signal;

recording means for recording the recordable signal from said signal processor onto a recording medium;

strobe means for emitting stroboscopic light, said strobe means including a charging circuit being capable of supplying a large current for exciting a lamp to generate the stroboscopic light;

means for selectively holding a first battery package having a battery with known internal resistance or holding a second battery package having a battery with an internal resistance smaller than said known internal resistance where said first battery package and said second battery package have substantially identical dimensions;

discriminating means for determining whether said first battery package or said second battery package is held by said means for holding; and voltage stabilizer means for stabilizing a voltage output from said first battery package and producing a substantially constant output voltage, wherein said signal processor receives the constant voltage from said voltage stabilizer when said discriminating means determines that said means for holding holds said first battery package.

6. The electric power supply system as set forth in claim 5, wherein said first battery package includes a plurality of batteries interconnected to form the primary battery, and said second battery package includes a single battery to form said secondary battery.

7. The electric power supply system as set forth in claim 5, wherein said first battery package includes a voltage stabilizer.

8. The electric power supply system as set forth in claim 7, wherein said voltage stabilizer comprises a DC-DC converter.

9. The electric power supply system as set forth in claim 7, wherein said means for holding includes a first positive voltage terminal for said signal processor, a second positive voltage terminal for said strobe means, and a negative voltage terminal for both said signal processor and said strobe means, and said first battery package includes a first positive voltage terminal connected through said voltage stabilizer to a positive electrode of said first battery package, and a negative voltage terminal connected to a negative electrode of said first battery package, so that when said means for holding holds said first battery package said first input terminal is connected through said first positive voltage terminal of said first battery package via said voltage stabilizer to the positive electrode, said second input terminal is connected through said second positive terminal of said first battery package to the positive voltage electrode, and said negative voltage terminal of said means for holding is connected through said negative voltage terminal of said first battery package to the negative electrode of said first battery package.

10. The electric power supply system as set forth in claim 9, wherein said second battery package includes a positive voltage terminal connected to a positive electrode of said second battery package and a negative voltage terminal connected to a negative electrode of said second battery package, so that when said holding means holds said second battery package said first and second input terminals are connected through said positive voltage terminal of said second battery package to the positive electrode of said second battery package, and said negative voltage terminal of said holding means is connected through said negative voltage terminal of said second battery package to the negative electrode of said second battery package.

11. The electric power supply system as set forth in claim 10, wherein said discriminating means includes a discriminating terminal disposed in said means for holding, said second battery package includes a terminal which is associated with said discriminating terminal and is connected to either electrode of said second battery package, said discriminating means determines that said means for holding holds said second battery package when said discriminating terminal contacts an associated terminal of said second battery package.

12. The electric power supply system as set forth in claim 7, wherein said first battery package and said second battery package are each formed in a rectangular solid shape of substantially identical dimensions.

* * * * *